United States Patent
Colbert et al.

(10) Patent No.: US 10,380,758 B2
(45) Date of Patent: Aug. 13, 2019

(54) METHOD FOR TRACKING SUBJECT HEAD POSITION FROM MONOCULAR-SOURCE IMAGE SEQUENCE

(71) Applicants: Marcus C. Colbert, Emerald Hills, CA (US); Anand Chandrasekaran, Chennai (IN)

(72) Inventors: Marcus C. Colbert, Emerald Hills, CA (US); Anand Chandrasekaran, Chennai (IN)

(73) Assignee: Mad Street Den, Inc., Fremont, CA (US)

( * ) Notice: Subject to any disclaimer, the term of this patent is extended or adjusted under 35 U.S.C. 154(b) by 42 days.

(21) Appl. No.: 15/407,069

(22) Filed: Jan. 16, 2017

(65) Prior Publication Data

US 2017/0316576 A1 Nov. 2, 2017

(30) Foreign Application Priority Data

Apr. 27, 2016 (IN) .................. 02806342704201650

(51) Int. Cl.
| | |
|---|---|
| *G06T 7/73* | (2017.01) |
| *G06T 17/10* | (2006.01) |
| *G06T 19/00* | (2011.01) |
| *G06T 19/20* | (2011.01) |
| *G06T 7/246* | (2017.01) |

(52) U.S. Cl.
CPC .............. *G06T 7/73* (2017.01); *G06T 7/246* (2017.01); *G06T 17/10* (2013.01); *G06T 19/006* (2013.01); *G06T 19/20* (2013.01); *G06T 2207/10016* (2013.01); *G06T 2207/30201* (2013.01); *G06T 2207/30204* (2013.01); *G06T 2215/16* (2013.01); *G06T 2219/2016* (2013.01)

(58) Field of Classification Search
CPC ......... G06T 7/73; G06T 17/10; G06T 19/006; G06T 19/20; G06T 2207/10016; G06T 2207/30201; G06T 2207/30204; G06T 2215/16; G06T 2219/20
See application file for complete search history.

(56) References Cited

U.S. PATENT DOCUMENTS

| | | | |
|---|---|---|---|
| 2008/0100622 A1* | 5/2008 | Gordon | G06T 7/251 345/427 |
| 2010/0150406 A1* | 6/2010 | Xiao | G06K 9/00261 382/118 |
| 2013/0015946 A1* | 1/2013 | Lau | G07C 9/00 340/5.2 |
| 2014/0071308 A1* | 3/2014 | Cieplinski | G06T 3/60 348/222.1 |
| 2016/0262608 A1* | 9/2016 | Krueger | A61B 3/0041 |

(Continued)

OTHER PUBLICATIONS

Dlib C++ library, version Oct. 10, 2016.

*Primary Examiner* — Vincent Rudolph
*Assistant Examiner* — Pinalben Patel
(74) *Attorney, Agent, or Firm* — Mersenne Law

(57) ABSTRACT

A subject's head position and motion can be tracked by analyzing a series of frames from a monocular camera and mapping distinguishing points visible in the frames onto an elliptical cylinder. The tracking data can be used to control a physical pan/tilt actuator or to reconfigure/reposition virtual objects, images of which can be synthesized and displayed, or composited back into the original frames and displayed.

9 Claims, 5 Drawing Sheets

(56) References Cited

U.S. PATENT DOCUMENTS

2016/0314341 A1* 10/2016 Maranzana ............. G06F 17/50
2017/0000581 A1*  1/2017 Tokuda .................. A61B 90/39
2017/0315364 A1* 11/2017 Masumoto ............ G06F 3/0484

* cited by examiner

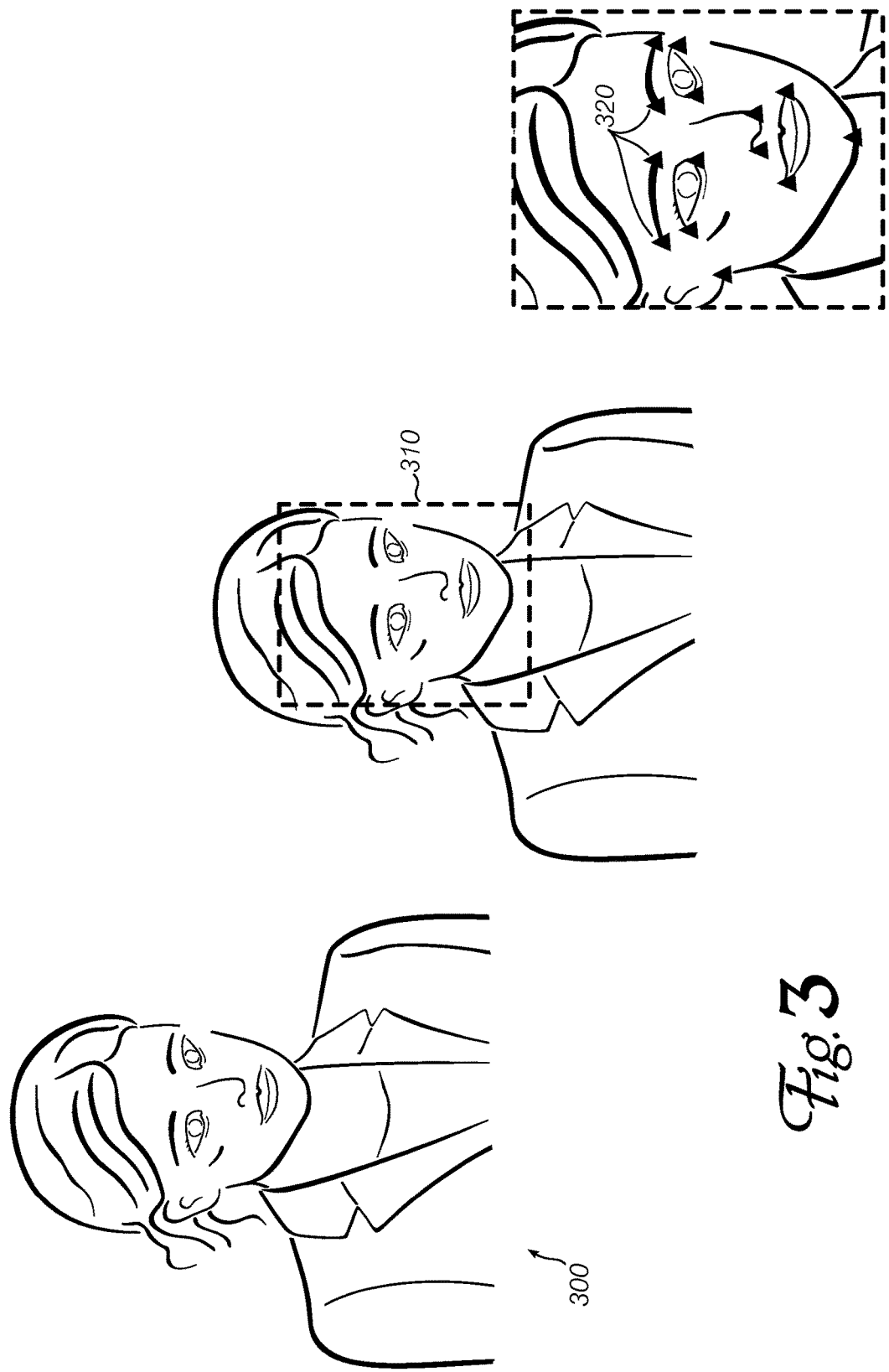

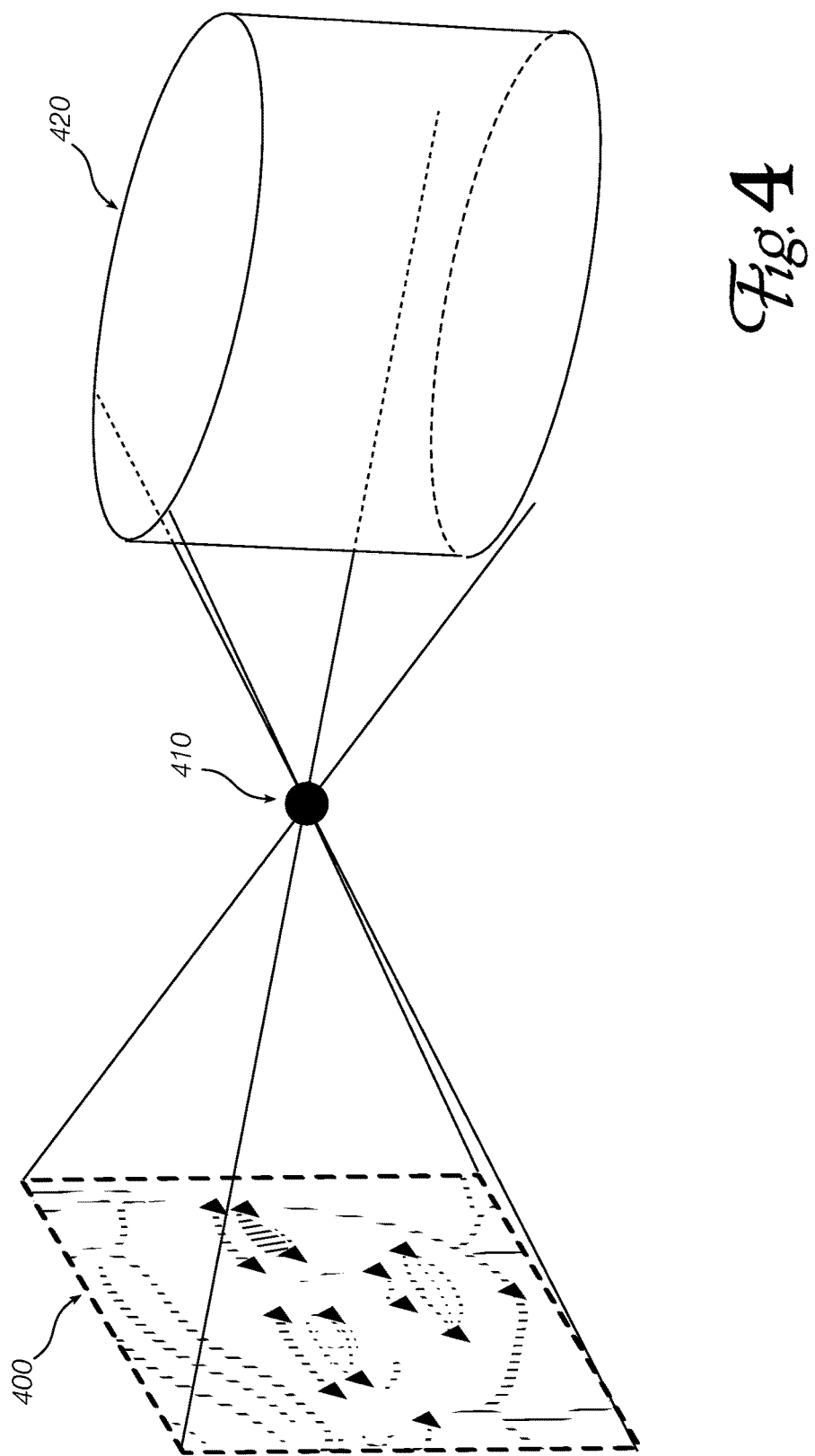

*Fig.* 5
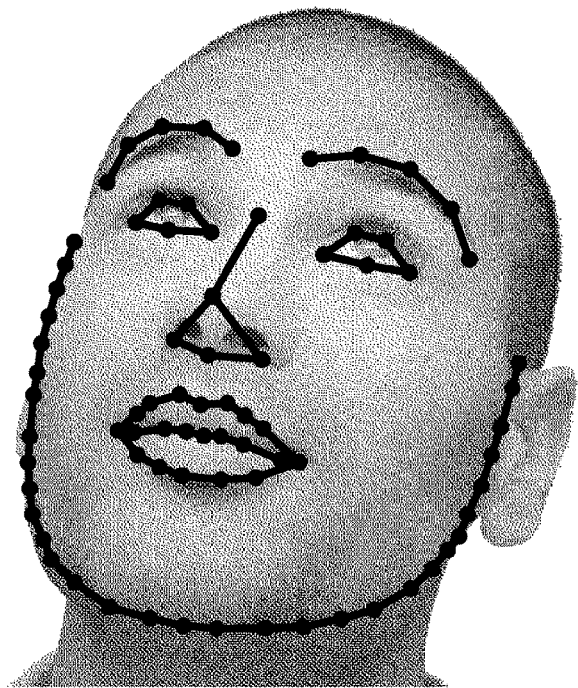
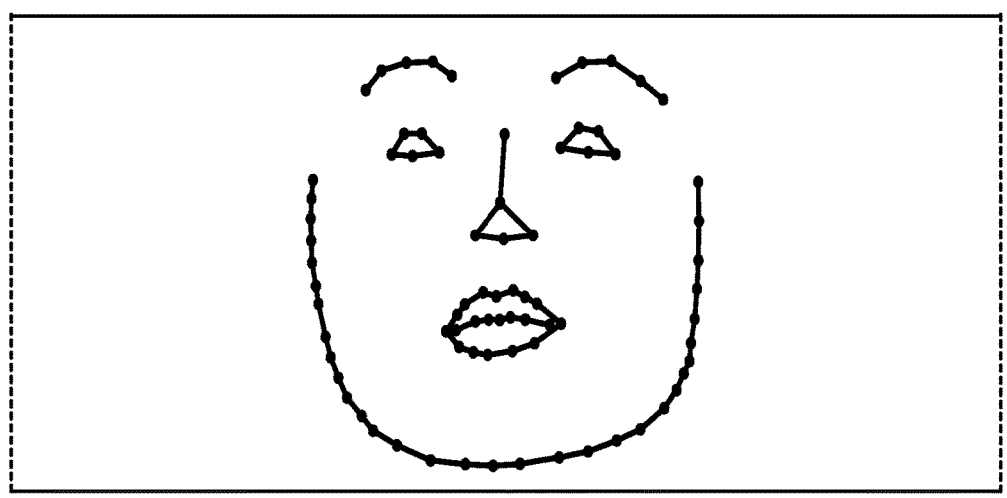
*Fig.* 6

METHOD FOR TRACKING SUBJECT HEAD POSITION FROM MONOCULAR-SOURCE IMAGE SEQUENCE

CONTINUITY AND CLAIM OF PRIORITY

This U.S. utility patent application claims priority to Indian Patent Application No. 02806342704201650359 filed 27 Apr. 2016. The entire disclosure of that application is submitted as an appendix to this disclosure and is hereby incorporated by reference.

FIELD

The invention relates to image processing and analysis. More specifically, the invention relates to estimating head position and orientation of a subject based on a sequence of raster images of the subject taken with a monocular camera.

BACKGROUND

The human body is highly reconfigurable courtesy of its many joints that allow motions (generally rotations) in a variety of directions. Many of these motions are under fine, conscious motor control, so they can be used to interface with and control devices and systems ranging from musical instruments to microsurgery actuators.

The head is an extremity with a number of degrees of freedom of motion, and because of its close connection with the operator's visual system, tracking head position offers a wealth of information about the person. For example, head position provides a strong clue as to what the person is looking at. Alternatively, if head position can be tracked, then the tracking information can be communicated to a mechanical system to control various aspects of the system—as many as the degrees of freedom that can be tracked. Thus, a person's head position can be used as a sensitive, multi-modal input device to control a system or operation, leaving the person's hands free for other activities. Thus, for example, head position can be used to control a camera in a remote-view application so that the camera looks in the direction the person turns his head, while his hands can manipulate a keyboard, joystick or other controller. Head position and orientation estimates can be used in a number of other applications as well; these will be discussed presently.

Current head-tracking systems generally rely on direct measurements with accelerometers, gyros and other sensors mounted to the head; or indirect measurements from one or more cameras observing carefully-placed marks on the subject's head. These approaches are effective and accurate, but rely on equipment and procedures that are expensive, cumbersome and/or difficult to calibrate. An alternate approach that uses commodity equipment and automatic calibration to produce fairly accurate head-position estimates can support many applications, and may be of significant value in the field.

SUMMARY

Embodiments of the invention process a sequence of images of a human subject. After an initial, automatic calibration is completed, the subject's head is modeled as an elliptical cylinder. Then, images in the sequence are analyzed to determine how the subject's head is moving, turning and/or tilting. The analysis involves simulating translation and rotation of the elliptical-cylinder model, and determining what movements would produce an image similar to that delivered by the camera. The best-fit movements are emitted as estimates of subject-head motion, and may be used in a variety of applications.

BRIEF DESCRIPTION OF DRAWINGS

FIG. 3 illustrates a portion of the processing of a raster image of a person.

FIG. 4 shows mapping from a two-dimensional raster image to a three-dimensional elliptical cylinder.

FIG. 5 shows example fiducials detected on a raster image of a face.

FIG. 6 shows the unwrapped surface of an elliptical cylinder, with fiducials mapped thereon.

DETAILED DESCRIPTION

Embodiments of the invention analyze a sequence of two-dimensional raster images including a subject's face to extract information and build a simple 3D model of the person's head. Subsequent images can be analyzed and mapped to the model to produce an estimate of how the subject's head has moved between the image frames. The estimate can be used to control a tilt/pan actuator (for example, to change the orientation of a camera similarly to the subject's head position) or to alter a more complex 3D model in the course of rendering simulated images from the model. Images for analysis may be taken from an uncalibrated, consumer-grade camera, such as a laptop, cell phone or tablet camera.

An embodiment of the invention can be employed wherever a camera can obtain a series of images of one or more individuals at reasonable resolution and reasonably short intervals. The following discussion will focus on images from a laptop or cell phone camera, which offer a resolution on the order of 0.05 degrees per pixel and can typically deliver images at 30-50 ms intervals.

Figure 1:
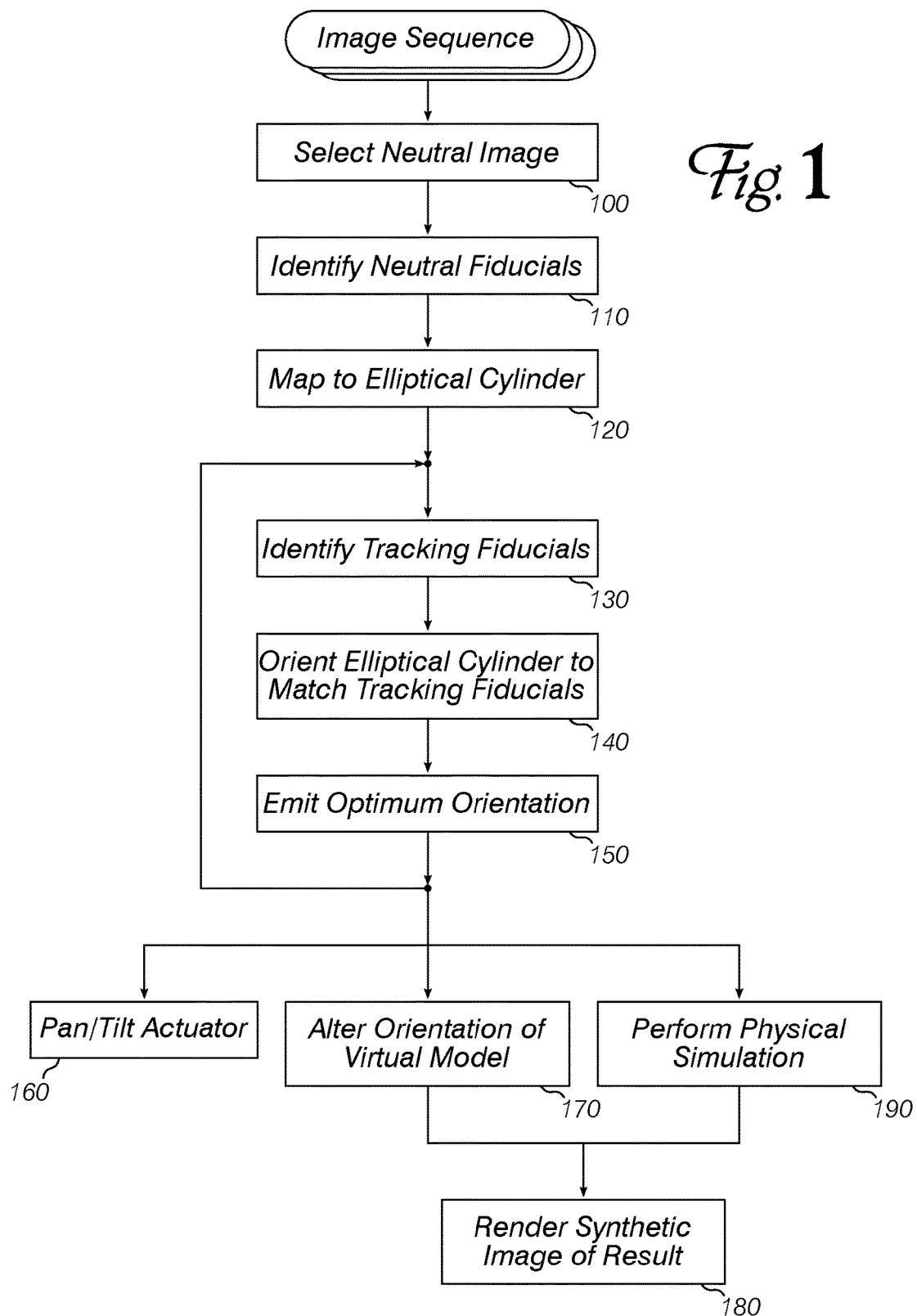
FIG. 1 is a flow chart outlining operations according to an embodiment of the invention.

Turning to FIG. 1, during an initial auto-calibration phase, a number of images from the sequence are processed to locate faces of the heads are to be tracked, and to find images where those faces are in a most neutral orientation towards the camera (100). Facial location may be accomplished by known means which typically return a bounding box (e.g., location, width and height) within the image, and the process can be improved by prompting the subjects to look at the camera, or to follow a mark as it moves across their visual field. Embodiments can track multiple subjects' heads simultaneously, but for clarity of explanation, we will describe the case where only one subject is in the camera's view.

The auto-calibration images are analyzed and annotated with "fiducials" (110). "Fiducials" are recognizable points on an identified face that will move with the head in a predictable way. A prior-art indirect head-tracking system (i.e., one that relies on processing camera images rather than direct measurement of motion via accelerometers and gyros) might rely on manually-placed, easily-identified marks such as high-contrast or unusual-color makeup dots (and such marks can also be used by an embodiment of the invention) but in keeping with the goal to have a low-setup, low-calibration system, embodiments will typically use natural landmarks such as corners of eyes, eyebrows, corners of mouth, nostrils and the like. (If moles or other high-contrast features are present, these may also be used to improve subsequent operations.) Of these landmarks, corners of eyes and nostrils may be most useful, because they do not move as much as the mouth (e.g. in a smile) or the eyebrows (e.g., in a frown). However, it is preferable that an embodiment locate and use as many fiducials as possible, even if some of them provide less-precise positioning information than others.

For purposes of this specification, a "fiducial" is a mark or feature on a subject's face or head that can be identified in an image of the subject via automatic image processing, which mark indicates a relatively consistent position on the subject's head despite motion (rotation, tilting, translation) of the head. An "intrinsic fiducial" is a natural mark such as a mole, or identifiable feature such as a corner of the subject's eye. An "extrinsic fiducial" is an artificial mark added to assist an image processing system. Extrinsic fiducials may be, for example, ink dots, tattoos, makeup dots or reflective markers.

Once the initial auto-calibration images have been annotated, one neutral-position image is selected. This may be one where fiducials are evenly distributed over left and right halves of the detected face.

The fiducials are projected toward and through a point at an estimated (or known) distance to the camera, and further mapped onto a neutrally-oriented elliptical cylinder beyond the camera (120). This elliptical cylinder serves as an embodiment's model for the subject's head position. The cylinder's lengthwise axis will track the subject's head along the intersection between the coronal and mid-sagittal planes (roughly crown to chin), while the major elliptical axis tracks the mid-sagittal-transverse intersection (nose to back of head), and the minor elliptical axis tracks the coronal-transverse intersection (ear to ear). Any suitable coordinate system can be used (and it is within ordinary skill in the art to perform linear conversions from one coordinate system to a different system) but the following discussion will consider rotations about the cylinder's lengthwise axis (corresponding to the subject shaking her head left to right), and inclinations of the lengthwise axis fore and aft (nodding) or side to side (tilting the head sideways, ear towards shoulder). It is appreciated that translation of the subject's head (i.e., linear motion in any combination of orthogonal directions) confounds accurate detection of the rotational movements. An embodiment attempts to model and track six parameters: rotation about three axes (through a center of rotation within the elliptical cylinder, or at the base of the cylinder, corresponding to the top of the cervical vertebrae), and translation of the cylinder along three axes (the subject moving with respect to the camera).

The use of an elliptical-cylinder model represents a favorable compromise between simple, efficient computations; and accurate representation of a subject's head. (Instead of an elliptical cylinder, one may use e.g. an oblate spheroid or higher-order solid that approximates the subject's head shape more closely, but the improvements in tracking accuracy may not justify the additional computational expense.) By using an elliptical cylinder with a major-to-minor axis ratio of about 1.35, one can account for the differences in fiducial motion between fiducials further from an axis of rotation (e.g., a fiducial on the nose), as compared to fiducials nearer the axis of rotation (e.g., on the cheeks), without requiring a more-accurate model of the subject's head. In an alternate implementation, the fiducials can be mapped to one of a plurality of concentric cylinders (i.e., ordinary round cylinders having varying radii, whose axes are superimposed on each other). Some fiducials (e.g. the nose and nostrils) are mapped onto the outer, largest cylinder; some (e.g. the eyebrows and facial outline) are mapped to an intermediate cylinder, and some (e.g. the eyes) are mapped to an inner cylinder. This alternate arrangement also accounts for relative differences in fiducial motion due to the varying distances of parts of the subject's head from the varying axes of rotation. An embodiment of this form must use at least two concentric cylinders, but may use three or more.

Once the automatic configuration process is complete, an embodiment acquires subsequent images of the subject. These are preferably two-dimensional raster images from the same camera, at about the same distance and relative orientation, but an embodiment can accommodate some degree of variation in distance and orientation, as might be encountered, for example, in images from a hand-held camera.

In some embodiments, additional information may be available from the camera to assist further processing. For example, a cell phone camera may be able to provide accelerometer data to indicate changes in the camera orientation. Thus, if the camera is tilted back, the embodiment may anticipate a corresponding reduction in vertical displacement between fiducials, notwithstanding that the subject's head has not changed position or orientation.

For each acquired image, the embodiment locates the subject's face, then identifies as many fiducials as possible in the image (130). The fiducial locations are projected back to and through the camera position as in the calibration step, but instead of mapping them to the elliptical cylinder, the cylinder is oriented (rotated, translated and possibly scaled) to optimize the number and location of projected fiducials matching the calibration fiducial locations on the cylinder (140).

It is appreciated that some fiducials will go out of view as the subject's head moves, and other previously-unseen fiducials may be detected. However, to the extent that the same fiducials are identified in both calibration and operational images, the optimized cylinder orientation can provide an estimate of how the subject's head has moved between the calibration neutral position and the current position.

The orientation-optimization process may identify two or more potential orientations that have similar fit-quality metrics (i.e., the number of matching fiducials and the small distance between detected and expected locations). An embodiment may use second-order comparisons to select one of the potential orientations as the most likely: the orientation that has the smallest total angular displacement from an immediately-preceding estimate, or the orientation that has the smallest first and/or second derivatives of deltas from the preceding orientation estimates. These comparisons and selection heuristics reduce the chance that the subject head-position estimate will jump around randomly, or suggest that the subject is making physically-implausible motions.

Finally, the selected estimate of subject head position is emitted for use by a downstream process (150). Several example processes are detailed below. The embodiment loops back to acquire and process the next image of the subject. When new subject head position estimates are produced, they are also emitted for use by the downstream process.

The preceding operations of an embodiment produce a sequence of head-position estimates, indicating how the subject's head may have moved as a function of time. These estimates can be used in a variety of practical applications:

First-Person View Controller

A number of remote-view and telepresence systems include a remotely-located camera whose images are relayed back to a viewer. An embodiment operating at the viewer's location can track the viewer's head position and transmit the position/orientation estimates to the remote camera, where they are used to control a tilt/pan actuator coupled to the camera (160). Thus, the remote camera moves similarly to the viewer's head, so that its field of view matches what the remote viewer would expect to see by moving his head as the embodiment detected. It is appreciated that similar camera control could be provided by a prior-art joystick or similar input device, but by using the head-position estimate of an embodiment, more natural and intuitive camera control may be achieved, and the viewer/operator's hands are freed to use joysticks or other input devices to control other devices or actuators.

Motion Capture

Head (and body) motion capture, as well as more fine-grained facial capture, are mainstays in contemporary cinematography, where they permit a human actor to control a virtual model of a character that can be inserted into a film via computer generated imagery ("CGI"). Subject head tracking according to an embodiment is not expected to be accurate enough for large-format film work, but it is suitable for use in lower-resolution contexts. In particular, an embodiment can deliver head tracking information to a multiplayer game system, such as a Massively Multiplayer Online Role-Playing Game ("MMPORG"), where the information can be used to position a virtual model of a player (170). Synthetic images of the virtual model are rendered (180) and then displayed to other players—thus, an embodiment allows other players to see the first player moving his head around. This communicates additional information to improve gameplay: players can see in which direction others are looking, and may also be able to tell that a player is looking away (so that player may be unaware of or unprepared for an emergent situation in the game).

Physics Simulation, Virtual Accessory Display

Head position estimates can also be used to control physical simulations of virtual models. For example, embodiments of the invention can be used in an image-processing pipeline where a virtual accessory is composited into the sequence of images to show the subject's face with the accessory. Thus, image frames (video) from a simple laptop or phone camera can be modified to show the subject wearing different styles of eyeglasses, earrings or other jewelry, or even different haircuts and styles. The position estimates place the head model and the accessory model in a suitable relationship, and a physical simulation is performed (190) so that, for example, virtual earrings hang or swing as they might if the subject was actually wearing them, and eyeglasses can be viewed from a variety of angles as they might appear on the subject's face. The results of the simulation are rendered (180) and composited back into the video frame.

Note that although the input raster images lack depth information, the mapping to a 3D elliptical cylinder (or to several concentric round cylinders) synthesizes such information. The synthesized depth data can be provided to a modeling and rendering system so that hidden-line and hidden-surface occlusion can be performed. Thus, for example, the earpieces of a pair of virtual eyeglasses that would be invisible behind the subject's ear or head, can be culled from the rendered image.

In the overview flow description, it is suggested that there is a single model elliptical cylinder having mapped neutral fiducials, and that orientations of this cylinder are tested to determine which orientation provides the best match for tracking fiducials. However, a practical implementation of an embodiment can operate more efficiently to achieve better tracking (i.e., either lower processor utilization for a given tracking frequency, or a faster tracking rate without increasing processor speed or resources).

Figure 2:
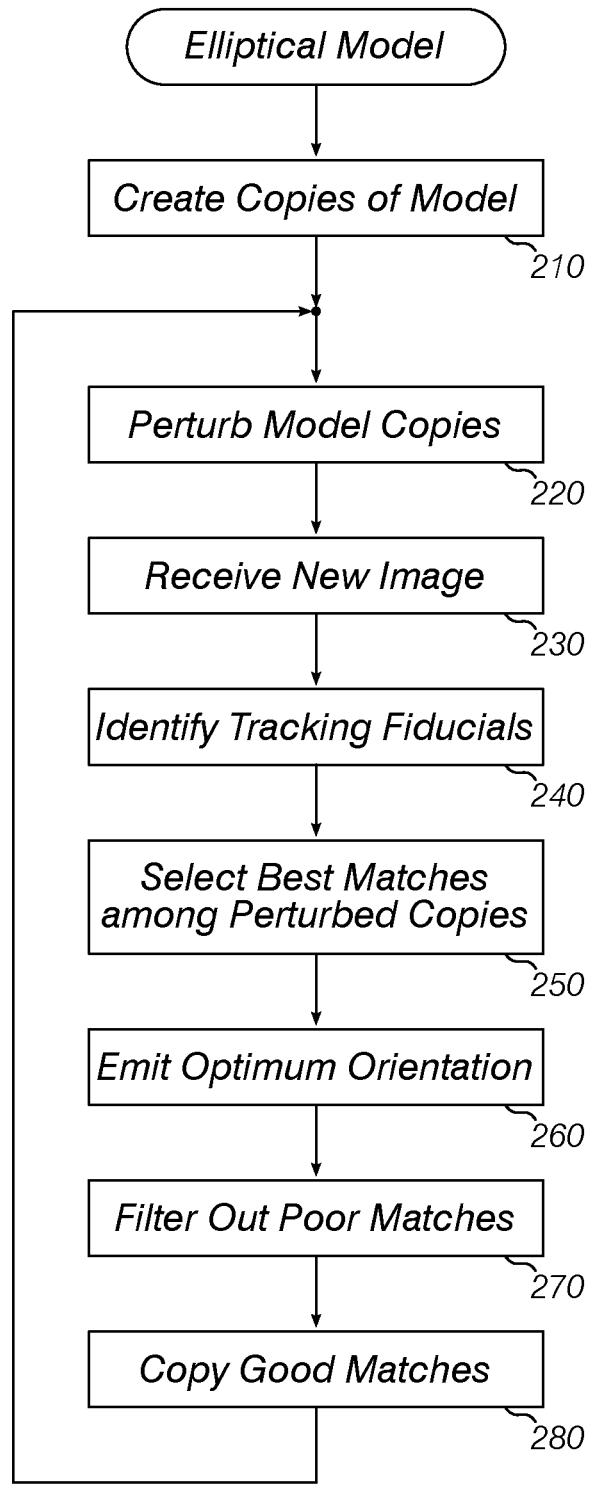
FIG. 2 is a flow chart outlining a practical and efficient implementation of a portion of an embodiment of the invention.

Such an embodiment uses techniques similar to those known as "particle filtering." Turning to FIG. 2, and beginning with the elliptical-cylinder (or concentric cylinders) model prepared during the automatic calibration, a number of copies of the model are instantiated (210), and each such copy is perturbed by a different translation, rotation, or combination thereof (220). A next raster image from the sequence is received (230) and tracking fiducials are identified (240). Then, a subset of the perturbed model copies which best match the tracking fiducials are selected (250). If one such model matches better than all others, its orientation may be emitted (260). If two or more models match approximately equally well, an average or similar weighted combination of their orientations may be emitted. However, in this latter case, rather than "condensing" the errors of the several nearby models to a single definitive position, the nearby models maintain their own perturbations. Finally, models that were not among the best are filtered away (270), and the best models are copied (280) and perturbed (220) for use in analyzing the next raster image.

Useful control parameters for this process include the number of perturbed copies carried forward through each "generation" and the magnitudes of the rotational and translational perturbations applied to the various copies. An embodiment may also maintain first derivatives of the perturbations. This would allow the particle model to represent and account for the velocity of the subject's motion. In other words, a subject shaking her head from left to right may pass through the same angles, but a slow head shake will produce more video frames (at a constant frame rate) and smaller frame-to-frame perturbations than a fast head shake. Perturbed head models with similar velocities to the subject's head will match and predict better—that is, models that match in both instantaneous position and velocity will produce a next generation of models that better match the subject's head position in the next image frame.

The particle filtering process is computationally inexpensive because calculations on an elliptical-cylinder model are simpler than corresponding calculations on a more-detailed 3D head model, and the maintenance of a number of nearby potential orientations helps stabilize the head tracking process. If only a single orientation for a model was selected and used, then any error in the model would accumulate and quickly saturate the plausible head-position space. For example, in an embodiment where the head position is used to control positioning of a virtual pair of eyeglasses to be composited into the image, error accumulation might cause the glasses to float around to the side of the subject's head, or to fly out of the image entirely.

Note that although the elliptical-cylinder model described above decreases the computational complexity of head tracking, once the tracking coordinates are obtained, they can be used to control a model of arbitrary complexity. This is feasible because a single transformation, even of a complex model, can be done relatively quickly. The difficulty in using a complex model for tracking lies in testing a large number of possible head orientations to see which one best matches the image acquired from the camera.

An embodiment can also be used to provide a rough tracking estimate, which is then refined by re-mapping the raster image onto a more-detailed model of the subject's head. In this manner, the number of complex-model configurations to be tested can be reduced by limiting them to positions and orientations near to what the elliptical-cylinder model suggests.

Details of Elliptical-Cylinder Modeling

FIG. 3 shows an example of the image processing performed by an embodiment of the invention. A raster image 300 depicting the subject is obtained, and prior-art methods are used to find a rectangle 310 containing the subject's face. Then, feature identification is performed to locate fiducials (triangle marks, several of which are indicated by reference character 320).

Turning to FIG. 4, the annotated points of the two-dimensional raster image 400 (i.e., the corners and the fiducials) are projected through an imaginary "pinhole" lens 410 and onto an elliptical cylinder 420; the intersections between the projected points and the cylinder's surface are calculated and stored. One can visualize this operation as projecting or mapping the entire two-dimensional raster image onto the surface of the elliptical cylinder, but really, only the bounding-box corners and fiducials are important.

FIG. 5 shows the output of a fiducial-identification process analyzing a raster image of a person looking up and to the right. The human eye and brain can quickly build an accurate 3D model from the image, but machine-implemented image processing techniques are much more limited—the points and lines that the face identification process emits are all in the 2D plane of the image, and there is no information available from which an algorithmic process can produce the "up and to the right" analysis. An embodiment of the invention maps the fiducials onto a 3D model such as an elliptical cylinder or a set of concentric round cylinders, and then uses that model to analyze subsequent sets of fiducials. FIG. 6 shows the surface of the elliptical cylinder "unwrapped," with the neutral fiducials marked.

An embodiment comprises modules (either software or hardware) for mapping points in two-dimensional space to and from three-dimensional space. These are not general-purpose point-to-surface mappers, but rather special-purpose mappers that translate to and from points on the surface of an elliptical cylinder. Note further that although it is easier to visualize and explain embodiments by reference to two- and three-dimensional operations (e.g. as shown in FIGS. 3 and 4), because rotations are not affine transformations, it is computationally more efficient to convert the various quantities to homogenous coordinates in a higher dimension so that the necessary operations can be performed as uniform matrix multiplications. Further, although scaling was mentioned previously, if the focal length of the camera does not change, scaling can be represented by translations towards or away from the camera. (In fact, even if the focal length does change, if the change is known, then scaling can be considered to be a mere translation.)

A distinguishing characteristic of an embodiment is the ability, via hardware or software, to determine whether a point in two-dimensional space (i.e., a face bounding box corner or a fiducial) could lie on the surface of an elliptical cylinder in three-dimensional space (where the elliptical cylinder is in a predetermined position and orientation). If a large proportion of the 2D points could lie on the surface of the elliptical cylinder (according to this determining function), then the cylinder's position and orientation are a plausible solution for the subject's head position.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that tracking a subject's head position based on its appearance in a sequence of raster images can also be accomplished by software and hardware that distribute the functions of embodiments of this invention differently than herein described. Such variations and implementations are understood to be captured according to the following claims.

We claim:

1. A non-transitory computer-readable medium containing data and instructions to cause a programmable processor to perform operations comprising:
   analyzing an initial sequence of raster images of a subject to find a neutral image where a head of the subject is in a facing-forward position;
   identifying neutral fiducials in the neutral image;
   mapping the neutral fiducials to at least one three-dimensional cylinder model in a neutral position;
   receiving a tracking raster image after the initial sequence of raster images, said tracking raster image showing the head of the subject in a displaced position relative to the forward-facing position;
   identifying tracking fiducials in the tracking raster image;
   finding a displaced position of the at least one three-dimensional cylinder model such that the tracking fiducials map near the neutral fiducials on the at least one three-dimensional cylinder model;
   emitting tracking data to indicate how the displaced position is different from the neutral position;
   altering a configuration of a three-dimensional virtual model according to the tracking data;
   rendering an image of the three-dimensional virtual model; and
   displaying the image of the three-dimensional virtual model.

2. The non-transitory computer-readable medium of claim 1, wherein the at least one three-dimensional cylinder model is exactly one three-dimensional elliptical cylinder model.

3. The non-transitory computer-readable medium of claim 1, wherein the at least one three-dimensional cylinder model is at least two concentric round cylinders having a common central axis.

4. The non-transitory computer-readable medium of claim 1, wherein the three-dimensional virtual model is a character in a massively multiplayer online role-playing game ("MMPORG").

5. The non-transitory computer-readable medium of claim 1, wherein the image of the three-dimensional virtual model is displayed to an individual different from the subject.

6. The non-transitory computer-readable medium of claim 1, wherein the three-dimensional virtual model is a pair of eyeglasses.

7. The non-transitory computer-readable medium of claim 6, wherein the image of the three-dimensional virtual model is displayed to the subject.

8. The non-transitory computer-readable medium of claim 1, wherein the three-dimensional virtual model is hair.

9. The non-transitory computer-readable medium of claim 8, wherein the image of the three-dimensional virtual model is displayed to the subject.

* * * * *